United States Patent Office 3,311,568
Patented Mar. 28, 1967

3,311,568
METHOD FOR PRODUCTION OF CATALYST FOR HYDRATION OF OLEFINS TO ALCOHOLS
Mikhail Jakovlevich Klimenko, Moscow, U.S.S.R., assignor to Nauchno-Issledovatelsky Institute Sinteticheskikh Spirtov i Organicheskikh Produktov, Moscow, U.S.S.R.
No Drawing. Filed Feb. 1, 1965, Ser. No. 429,663
5 Claims. (Cl. 252—435)

This invention relates to a method of producing an improved catalyst intended mainly for the hydration of unsaturated hydrocarbons.

It is known that composite catalysts comprising phosphoric acid of specified concentration supported on a siliceous carrier are used for the hydration of olefins to alcohols in the vapor phase. It is also known that natural siliceous deposits such as diatomite, kieselguhr or diatomaceous earth are the most suitable carriers of this type. However there exist a number of difficulties in the preparation of the catalyst carriers of said materials. These difficulties arise from the fact that the naturally occurring porous siliceous materials, such as kieselguhr, diatomite or diatomaceous earth, vary in their chemical composition not only in different deposits but in the same deposit as well.

It is known that in order to reduce the metal oxide content in the carrier of natural porous siliceous materials, the calcined carrier can be treated with an aqueous solution of phosphoric acid (U.S. Patent No. 2,960,477 of Nov. 15, 1960, William C. Smith et al.).

However, the activity of the final catalyst is dependent not only on the metal oxide content in the carrier, but also on the physical structure of the carrier acquired by the latter in the process of molding and calcining the initial siliceous material.

The final physical structure of the carrier and its strength depend not only on the molding and calcining conditions but also on the chemical composition of the starting material and its plastic properties.

The primary object of the present invention is to work out a method for the production of a catalyst of high strength and activity which would provide for high yields of alcohols in the process of the direct hydration of olefins.

It has been found that for the production of highly active catalysts which would promote the hydration of olefins to alcohols, the siliceous carrier should contain aluminum oxide and iron oxide in a total amount not exceeding 8 percent by weight. We have also found that the mechanical strength of the siliceous carrier can be considerably improved if clay containing 50–60% silica and 11–22% aluminum oxide, preferably of bentonite (montmorillonite) type is added to the natural siliceous material.

The addition of clay improves the plastic properties of the paste intended for molding as compared to the paste prepared from the natural porous siliceous material without said clay additive, which considerably improves the carrier strength.

We have found that the addition of clay in an amount from 1 to 10 percent of the total weight of dry components (preferably from 3 to 5 percent by weight) does not substantially affect the activity of the catalyst, since the content of iron oxide and aluminum oxide in the final carrier does not exceed the limit specified above.

It has been also discovered that the best results may be obtained if titanium dioxide is added to the carrier which prevents the carrier pores from sintering in the process of calcining at high temperatures.

Thus a highly porous structure of the carrier is obtained which results in catalysts of higher activity. On the other hand, this composite additive affects the carrier structure in such a way, that it becomes especially resistant to the action of phosphoric acid in the process of hydration which results in a higher catalyst activity and a longer useful life of the catalyst.

Titanium dioxide is added in an amount from 1 to 10 percent of the total weight of the dry components of the paste, the preferable quantity being from 3 to 5 percent by weight.

In case when the chemical composition of the starting porous siliceous material does not provide for obtaining a carrier containing not more than 8 percent by weight of iron oxide and aluminum oxide, the starting material is treated with an aqueous solution of a mineral acid with subsequent washing with water until no anions of this acid are detected in the washings. This procedure reduces the content of iron oxide and aluminum oxide in the starting material to the value required for the production of a carrier with not more than 8 percent by weight of the total aluminum and iron oxide content.

Such acids as sulphuric, nitric, hydrochloric or phosphoric can be used as the mineral acid, but I have found that the preferable acids are sulphuric, nitric or hydrochloric ones.

The acid treatment of the siliceous material should be done by heating said material in the acid solution, the best results being obtained with boiling acid.

The acid of any concentration can be used for the treatment of the starting siliceous material, but 10 to 20 percent by weight concentrations are the most convenient.

The acid-treated siliceous material is then drained on a filter and washed with water until no anions of the acid used in the treatment are detected in the washings. Then the treated material can be dried in the ordinary way in an oven, drying cabinet, or any other kind of drying equipment, and then used in the further processing for the production of the carrier as described above. The preliminary drying of the treated and washed material is not obligatory and the acid-treated material can be mixed with the other components immediately after draining on a filter.

In accordance with my invention, the carrier is prepared by mixing a porous siliceous material, such as kieselguhr, diatomite, or diatomaceous earth, and titanium dioxide and bentonite clay with water. The moulding of the prepared paste is carried out either by a screw-type molding machine, or by a tabletting press, or by similar equipment. The molded carrier is then dried in an oven, drying cabinet, or any other kind of drying apparatus, at a temperature of from 105 to 200° C. and then calcined at a temperature from 1,050 to 1,350° C. for a period of time sufficient for the carrier to acquire the required physical structure.

The calcining may last from 5 to 24 hours but the preferable calcining time is from 5 to 10 hours.

Thus prepared, the calcined carrier is then saturated with phosphoric acid. This can be carried out in a reactor for the hydration of ethylene and in a separate apparatus as well.

Orthophosphoric acid of 55–56% concentration (by weight) is used to saturate the carrier.

Examples 1, 2, 3 and 4 which serve to illustrate the invention, described a method for preparing and testing catalysts of diatomite which contained 90.17% $SiO_2$, and 5.04% $(Al_2O_3+Fe_2O_3)$. Examples 5, 6, 7 and 8 describe a method for preparing and testing catalysts of diatomite which contained 83.43% $SiO_2$ and 8.47% $(Al_2O_3+Fe_2O_3)$.

EXAMPLE 1

92 parts by weight of diatomite, 3 parts by weight of bentonite clay and 5 parts by weight of titanium dioxide were mixed with water to a paste which was then pressed into tablets of 4 mm. in diameter and 4 mm. long. The tabletted carrier was dried and then calcined at a temperature of 1,200° C. for 5 hours.

The crushing strength of the calcined carrier was 200 kg./sq. cm.; the porosity, 63.2%.

The obtained carrier contained 5.46% ($Al_2O_3+Fe_2O_3$).

The prepared carrier was then soaked in phosphoric acid solution for 1 hour and dried at a temperature of 140° C.

A gaseous mixture of steam and ethylene taken at a molar ratio of 0.7:1 was passed through the catalyst at a rate of 2,200 to 2,400 litres of ethylene per litre of catalyst per hour.

The total pressure in the reactor was 75 kg./sq. cm. The temperature of the catalyst bed was maintained at 290° C.

Phosphoric acid was introduced into the reactor after every 24 hours of operation. The test lasted 1,500 hours. No reduction in the catalytic activity was observed within the entire period. The alcohol yield was 200–240 g. per litre of catalyst per hour, the rate of ethylene flow being 2,200 and 2,400 litres per litre of the catalyst, per hour, respectively.

EXAMPLE 2

90 parts by weight of diatomite, 3 parts by weight of bentonite clay, and 7 parts by weight of titanium dioxide were mixed with water to a paste which was used to prepare the catalyst by the procedure of Example 1. The strength of the calcined carrier was 212 kg./sq. cm., the porosity, 62.7%. The obtained carried contained 5.31% ($Al_2O_3+Fe_2O_3$).

A gaseous mixture of steam and ethylene taken at a molar ratio of 0.7:1 was passed through the catalyst supported on said carrier at a rate of ethylene flow of 2000 litres per litre of catalyst per hour. The total pressure within the reactor was 75 kg./sq. cm. The temperature of the catalyst bed was maintained at 290° C.

The alcohol yield was 200 g. per litre of catalyst per hour.

EXAMPLE 3

90 parts by weight of diatomite, 7 parts by weight of bentonite clay and 3 parts by weight of titanium dioxide were mixed with water to a paste. The further procedure for the preparation of the carrier and the catalyst supported on it was identical to that of Example 1. The strength of the calcined carrier was 190 kg./sq. cm.; the porosity, 62.4%. The obtained carrier contained 6.05% by weight ($Al_2O_3+Fe_2O_3$).

The finished catalyst was tested under the conditions indicated in Example 2; the yield of alcohol was 192 g. per litre of catalyst per hour.

EXAMPLE 4

For the purpose of comparison a catalyst was prepared on a diatomite carrier without any additives. 100 parts by weight of diatomite were mixed with water to a paste. The further preparation of the carrier and the catalyst supported on it was identical to that in Example 1. The strength of the obtained carrier was 106 kg./sq. cm.; the porosity, 66.0%. The obtained carrier contained 5.18% ($Al_2O_3+Fe_2O_3$).

The finished catalyst was tested under the conditions indicated in Example 2. The yield of alcohol was 202 g. per litre of catalyst per hour.

EXAMPLE 5

100 parts by weight of diatomite containing 83.43% $SiO_2$ and 8.37% ($Al_2O_3+Fe_2O_3$) were boiled for 8 hours in 700 parts by weight of a 10% sulfuric acid solution. Then the acid was removed and the diatomite was drained and washed with water until no sulfate ions were detected in the washings. The diatomite was dried at a temperature of 140° C. The dried diatomite contained 91.16% $SiO_2$, 3.95 $Al_2O_3$ and traces of $Fe_2O_3$.

92 parts by weight of the modified diatomite, 3 parts by weight of bentonite clay and 5 parts by weight of titanium dioxide were mixed with water to a paste.

The further procedure for the preparation of the carrier and the catalyst supported on it was identical to that of Example 1 with the exception that the temperature of carrier calcining was 1,100° C. The strength of the calcined carrier was 246 kg./sq. cm.; the porosity, 59.6%. The obtained carrier contained 4.43% by weight ($Al_2O_3+Fe_2O_3$).

The finished catalyst was tested under the conditions indicated in Example 2, with the exception that the ethylene flow rate was changed from 2,000 to 2,200 litres per litre of catalyst per hour. The alcohol yield in this case was 205 and 218 g. per litre of catalyst per hour, respectively.

EXAMPLE 6

100 parts by weight of diatomite of the same chemical composition as the starting diatomite of Example 5 were treated with 700 parts by weight of a 10% hydrochloric acid solution by the procedure of Example 5. The dried product contained 91.7% $SiO_2$, 3.85% $Al_2O_3$ and traces of $Fe_2O_3$.

92 parts by weight of the modified diatomite, 5 parts by weight of bentonite clay and 3 parts by weight of titanium dioxide were mixed with water to a paste. The further preparation of the carrier and the catalyst supported on it was identical to that of Example 1 with the exception that the temperature of carrier calcining was 1,100° C. The calcined carrier strength was 237 kg./sq. cm.; the porosity, 59.4%. It contained 4.79% ($Al_2O_3+Fe_2O_3$).

The catalyst supported on said carrier was tested under the conditions indicated in Example 2.

The alcohol yield was 213 g. per litre of catalyst per hour.

EXAMPLE 7

100 parts by weight of diatomite of the same chemical composition as the starting diatomite in Example 5 were treated with 700 parts by weight of a 10% nitric acid solution. The treatment of the diatomite with said acid solution, its washing with water and subsequent drying were carried out by the procedure of Example 5. The dried product contained 91.40% $SiO_2$, 3.57% $Al_2O_3$ and traces of $Fe_2O_3$.

90 parts by weight of the modified diatomite, 5 parts by weight of bentonite clay and 5 parts by weight of titanium dioxide were mixed with water to a paste. The further preparation of the carrier and the catalyst supported on it was carried out by the procedure of Example 1 with the exception that the temperaure of carrier calcining was 1,100° C. The calcined carrier strength was 240 kg./sq. cm.; the porosity, 60%. The carrier contained 4.40% ($Al_2O_3+Fe_2O_3$).

The prepared catalyst was tested under the conditions indicated in Example 2. The alcohol yield was 202 g. per litre of catalyst per hour.

EXAMPLE 8

For the purpose of comparison, a catalyst was prepared on the carrier of the starting diatomite of Example 5 but which was not treated with acid. 100 parts by weight of said diatomite were mixed with water. The further preparation of the carrier and the catalyst was carried out by the procedure of Example 1 with the exception that the temperature of carrier calcining was 1,100° C. The calcined carrier contained 9.03% ($Al_2O_3+Fe_2O_3$). The strength of the carrier was 267 kg./sq. cm.; the porosity, 53.1%.

The finished catalyst was tested under the conditions indicated in Example 2. The alcohol yield in this case was 103 g. per litre of catalyst per hour.

What I claim is:

1. A method of producing a catalyst for the hydration of olefins to alcohols supported on a carrier of a natural porous siliceous material, which comprises preparing a paste by mixing with water the siliceous material selected from the group containing diatomite, kieselguhr and diatomaceous earth, and bentonite clay which is added in an amount from 1 to 10%, of the total weight of the dry mixture and titanium dioxide added in an amount from 1 to 10%, of the total weight of the dry mixture, shaping said paste, calcining the obtained molded carrier at temperatures from 1,050 to 1,350° C. and saturating it with phosphoric acid solution.

2. A method of producing a catalyst for hydration of olefins to alcohols supported on a carrier of a natural porous siliceous material, which comprises pretreatment of the porous siliceous material selected from the group containing diatomite, kieselguhr and diatomaceous earth with a hot aqueous solution of an inorganic acid at the boiling point of the solution and washing the treated material with water, preparing a paste by mixing said siliceous material with bentonite clay added in an amount from 3 to 5%, of the total weight of the dry mixture, and titanium dioxide added in an amount from 3 to 5% of the total weight of the dry mixture, shaping said paste, calcining the obtained molded carrier at temperatures from 1,050 to 1,350° C. and saturating it with phosphoric acid solution.

3. A method of producing a catalyst according to claim 1 wherein bentonite clay is added in amounts of 3 to 5% of the total dry weight of the material and titanium dioxide is added in amounts ranging from 3 to 5% of the total dry weight of the material.

4. A method of producing a catalyst for hydration of olefins to alcohols comprising the steps of preliminary treatment of a porous siliceous material selected from the group of diatomite, kieselguhr, and diatomaceous earth, with a hot aqueous solution of an inorganic acid at temperatures ranging from about 40° C. to the boiling point of said solution for several hours and washing the resultant material with water, preparing a paste by mixing said treated siliceous material with bentonite clay added in amounts of 1 to 10% of the total dry weight of the mixture, and titanium dioxide added in amounts of 1 to 10% of the total dry weight of the mixture, molding said paste, calcining the resulting molded carrier at temperatures ranging from 1050 to 1350° C., and saturating said calcined carrier with a solution of phosphoric acid.

5. A method of producing a catalyst according to claim 4, wherein bentonite clay is added in amounts of 3 to 5% of the total dry weight of the material and titanium dioxide is added in amounts ranging from 3 to 5% of the total dry weight of the material.

References Cited by the Examiner

UNITED STATES PATENTS

| | | | |
|---|---|---|---|
| 2,642,402 | 6/1953 | Corner et al. | 252—435 |
| 2,656,323 | 10/1953 | Bielawski et al. | 252—435 |
| 2,843,640 | 7/1958 | Langolis et al. | 252—450 X |
| 2,960,477 | 11/1960 | Smith et al. | 252—435 |
| 3,170,885 | 2/1965 | Morrell | 252—435 |

OSCAR R. VERTIZ, *Primary Examiner.*

A. GREIF, *Assistant Examiner.*